(12) United States Patent
Kunou

(10) Patent No.: US 8,308,237 B2
(45) Date of Patent: Nov. 13, 2012

(54) IMAGE DISPLAY

(75) Inventor: Tadashi Kunou, Osaka (JP)

(73) Assignee: Panasonic Corporation, Osaka (JP)

( * ) Notice: Subject to any disclaimer, the term of this patent is extended or adjusted under 35 U.S.C. 154(b) by 154 days.

(21) Appl. No.: 12/595,539

(22) PCT Filed: Mar. 12, 2008

(86) PCT No.: PCT/JP2008/000541
§ 371 (c)(1),
(2), (4) Date: Oct. 12, 2009

(87) PCT Pub. No.: WO2008/139673
PCT Pub. Date: Nov. 20, 2008

(65) Prior Publication Data
US 2010/0045088 A1      Feb. 25, 2010

(30) Foreign Application Priority Data

May 14, 2007    (JP) .................................. 2007-127595

(51) Int. Cl.
*A47C 7/62* (2006.01)
*A47C 15/00* (2006.01)

(52) U.S. Cl. ..................................... 297/217.3; 297/243

(58) Field of Classification Search .................. 297/243, 297/217.3
See application file for complete search history.

(56) References Cited

U.S. PATENT DOCUMENTS

| | | | | |
|---|---|---|---|---|
| 4,788,588 A * | 11/1988 | Tomita | ........................... | 348/602 |
| 5,267,775 A * | 12/1993 | Nguyen | ...................... | 297/217.3 |
| 5,507,556 A * | 4/1996 | Dixon | ........................ | 297/217.3 |
| 5,529,265 A * | 6/1996 | Sakurai | ...................... | 244/118.5 |
| 5,713,633 A * | 2/1998 | Lu | ................................... | 297/364 |
| 6,822,812 B1 * | 11/2004 | Brauer | .......................... | 359/742 |
| 6,994,236 B2 * | 2/2006 | Hsu | ............................... | 224/275 |
| 2005/0046755 A1 | 3/2005 | Hattori et al. | | |
| 2006/0249973 A1 | 11/2006 | Dreyer et al. | | |

FOREIGN PATENT DOCUMENTS

| | | |
|---|---|---|
| EP | 1 662 782 A1 | 5/2006 |
| EP | 1 671 845 A1 | 6/2006 |
| JP | 63-142387 A | 6/1988 |
| JP | 63-135383 U | 9/1988 |
| JP | 2-105752 U | 8/1990 |
| JP | 2005-067554 A | 3/2005 |
| JP | 2005-067555 A | 3/2005 |
| WO | 2005/016697 A1 | 2/2005 |

OTHER PUBLICATIONS

International Search Report for PCT/JP2008/000541.
European Search Report for 08720427.7-1268 dated Aug. 10, 2012.

* cited by examiner

*Primary Examiner* — Sarah B McPartlin

(74) *Attorney, Agent, or Firm* — Pearne & Gordon LLP

(57) ABSTRACT

An image display device comprising a plurality of seats arranged at least in a front-to-back direction, each of the seats having a backrest of a variable angle, an image display panel installed on the back of each seat, an angle sensing unit for detecting an angle of the backrest of the seat, a tilt angle calculating unit for calculating a tilt angle of the image display panel based on an output data of the angle sensing unit related to each of two adjoining seats in the front-to-back direction, and a tilt controller unit for controlling the tilt angle of the image display panel according to an output data of the tilt angle calculating unit.

12 Claims, 7 Drawing Sheets

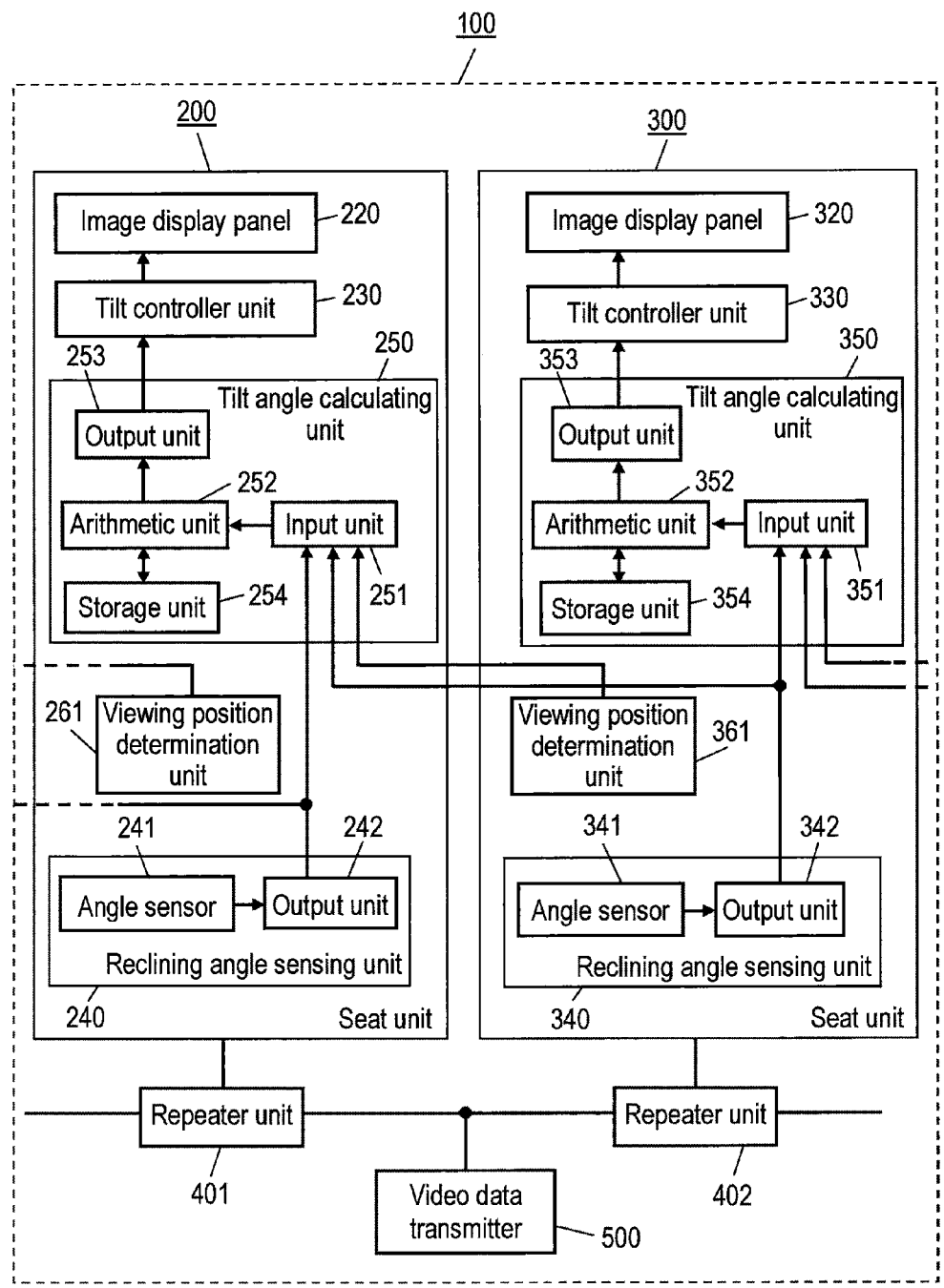

PRIOR ART

IMAGE DISPLAY

THIS APPLICATION IS A U.S. NATIONAL PHASE APPLICATION OF PCT INTERNATIONAL APPLICATION PCT/JP2008/000541.

TECHNICAL FIELD

The present invention relates to an image display device having a function of automatically adjusting a tilt angle of an image display panel serving for a viewer in each seat inside a large transporting apparatus such as an aircraft and a train provided with a plurality of passenger seats having reclining angles of their backrests adjustable.

BACKGROUND ART

Image display devices hitherto installed on passenger seats of aircrafts, trains and the like are generally of a type having an image display panel, a tilt angle of which is manually adjustable so that the passenger watching the display adjusts the tilt angle of it with his hand.

FIG. 6A and FIG. 6B show one example of such conventional image display devices installed on seats of an aircraft, a train or the like. FIG. 6A shows one aspect, for instance, wherein a tilt angle of an image display panel is being adjusted when backrest 421 of the front seat equipped with the image display device is reclined while viewer 401 keeps his backrest 402 in the upright position. Viewer 401 pulls image display panel 425 toward him to increase tilt angle θT around tilting pivot 424 and adjust it in a manner to set image display panel 425 generally perpendicular to a direction of his viewing axis. FIG. 6B shows another aspect, wherein the tilt angle of the image display panel is being adjusted when backrest 421 of the front seat is in the upright position while the viewer reclines backrest 402 of his seat. Viewer 401 pushes image display panel 425 to decrease tilt angle θT in the same manner to adjust image display panel 425 generally perpendicular to the direction of his viewing axis.

In this connection, various methods have been proposed in recent years for making adjustment of tilt angle of the image display panel automatically. Patent literature 1, for instance, discloses one such method. FIG. 7A and FIG. 7B illustrate the method. The method disclosed in this example uses linkage mechanism 550 for adjusting the tilt angle of image display panel 525, as shown in FIG. 7A. While viewer 501 stays with his backrest 502 in the upright position, when backrest 521 of the front seat is reclined, linkage mechanism 550 operates to increase a tilt angle of image display panel 525 to a degree proportional to an inclination angle of backrest 521. This completes automatic correction of the angle of image display panel 525 with respect to the direction of viewing axis of the viewer.

The conventional method of manually adjusting the tilt angle of the image display panel has a drawback, however, that, in many cases, viewer 401 is unable to reach image display panel 425 on the front seat with his hand unless he raises himself when backrest 402 of his seat is reclined low. Viewer 401 is therefore required to repeat raising himself and adjusting the tilt angle of image display panel 425 several times in order to obtain the optimum tilt angle. In addition, the tilt angle needs to be readjusted whenever a person in the front seat changes the reclining angle of his seat. The same is true when the viewer changes the reclining angle of his own seat. Changing of the reclining angle of the seats hence gives the user a troublesome task of adjustment, and it puts a significant burden upon him.

There are also some drawbacks with the another conventional method of making correction of the tilt angle of image display panel 525 simply with linkage mechanism 550 installed in the seat, that it leaves a problem in terms of adjusting accuracy of the angle besides the limitation in a range of the correctable angles against different viewing conditions of various users. Image display panel 525 provides generally a good viewability, in particular, when viewer 501 keeps backrest 502 of his seat not inclined. However, when viewer 501 reclines backrest 502 of his seat while backrest 521 of the front seat remains reclined as shown in FIG. 7B, the condition of viewability becomes poorer since this results in a large deviation of the viewing axis of the viewer from the direction perpendicular to the screen of image display panel 525.

Patent Literature 1: Japanese Patent Unexamined Publication, No. 1990-105752

SUMMARY OF THE INVENTION

The present invention was devised to solve the above problems, and to provide an image display device of high quality for passenger seat capable of maintaining an image display panel in a proper angle for viewing by a user at all times regardless of reclining positions of both seat of the user and another in front of it.

The image display device comprises seats arranged at least in a front-to-back direction, each of the seats having a backrest of a variable angle, an image display panel installed on a back of the seat, a reclining angle sensing unit for detecting an angle of the backrest, a tilt angle calculating unit for calculating a tilt angle of the image display panel based on an output data of the angle sensing unit related to each of two adjoining seats in the front-to-back direction, and a tilt controller unit for controlling the tilt angle of the image display panel according to an output data of the tilt angle calculating unit.

Another image display device comprises an image display panel installed on a back of a seat having a backrest of a variable angle, a first angle sensing unit for detecting an angle of the backrest of a first seat having the image display panel installed thereon, a second angle sensing unit for detecting an angle of a backrest of a second seat adjoining behind the first seat, a tilt angle calculating unit for calculating a tilt angle of the image display panel installed on the first seat based on the angle of the backrests of the seats detected by the first angle sensing unit and the second angle sensing unit, and a tilt controller unit for controlling the tilt angle of the image display panel according to the tilt angle calculated by the tilt angle calculating unit.

BRIEF DESCRIPTION OF DRAWINGS

FIG. 5 is a circuit block diagram showing a main structure of another image display device;

REFERENCE MARKS IN THE DRAWINGS

| | |
|---|---|
| 1 | Seat row |
| 2 and 3 | Seat unit |
| 20 and 30 | Seating part |
| 21 and 31 | Backrest |
| 22 and 32 | Armrest |
| 23 and 33 | Leg |
| 24 and 34 | Tilting pivot |
| 25, 35, 220 and 320 | Image display panel |
| 26 and 36 | Reclining shaft |
| 27, 37, 230 and 330 | Tilt controller unit |
| 28, 38, 240 and 340 | Reclining angle sensing unit |
| 29, 39, 250 and 350 | Tilt angle calculating unit |
| 100 | Image display device |
| 200 and 300 | Seat unit |
| 241 and 341 | Angle sensor |
| 242, 253, 342 and 353 | Output unit |
| 251 and 351 | Input unit |
| 252 and 352 | Arithmetic unit |
| 254 and 354 | Storage unit |
| 261 and 361 | Viewing position determination unit |
| 401 and 402 | Repeater unit |
| 500 | Video data transmitter |

DETAILED DESCRIPTION OF PREFERRED EMBODIMENT

Description is provided hereinafter of the preferred embodiment of the present invention with reference to FIG. 1 to FIG. 4.

EXEMPLARY EMBODIMENT

Figure 1:
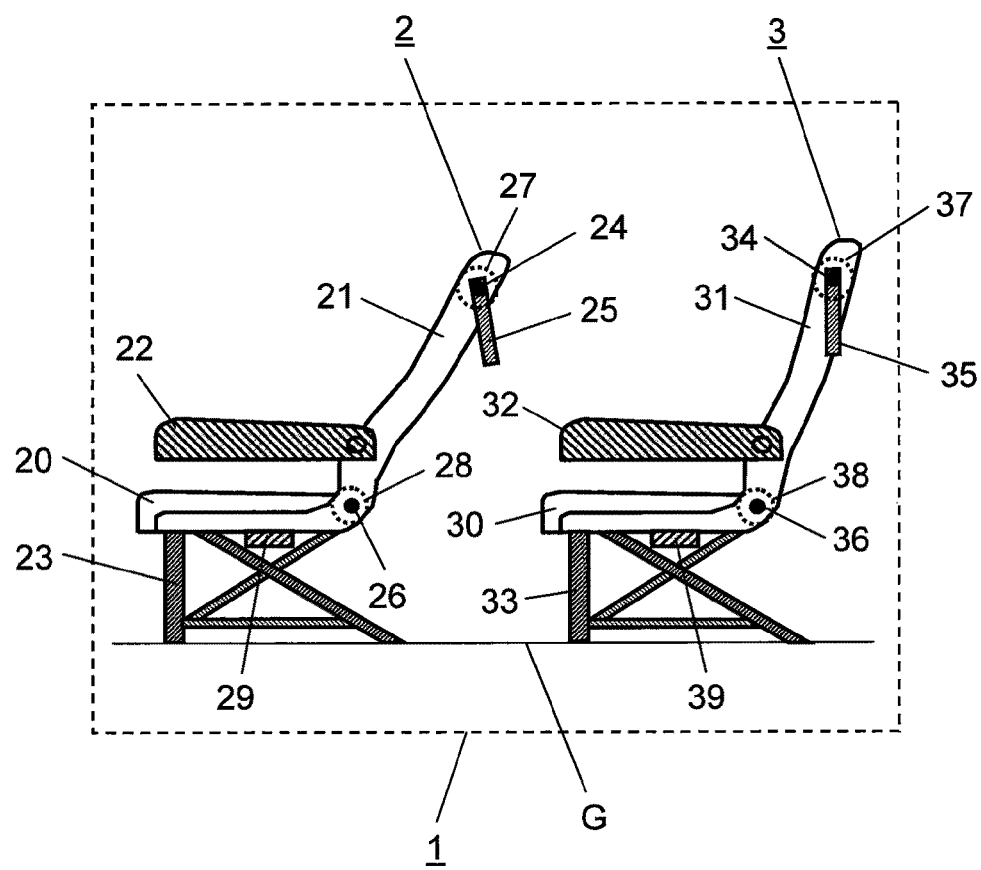
FIG. 1 is a schematic view showing a key structure of a seat row provided with an image display device according to an exemplary embodiment of the present invention.
Figure 2:
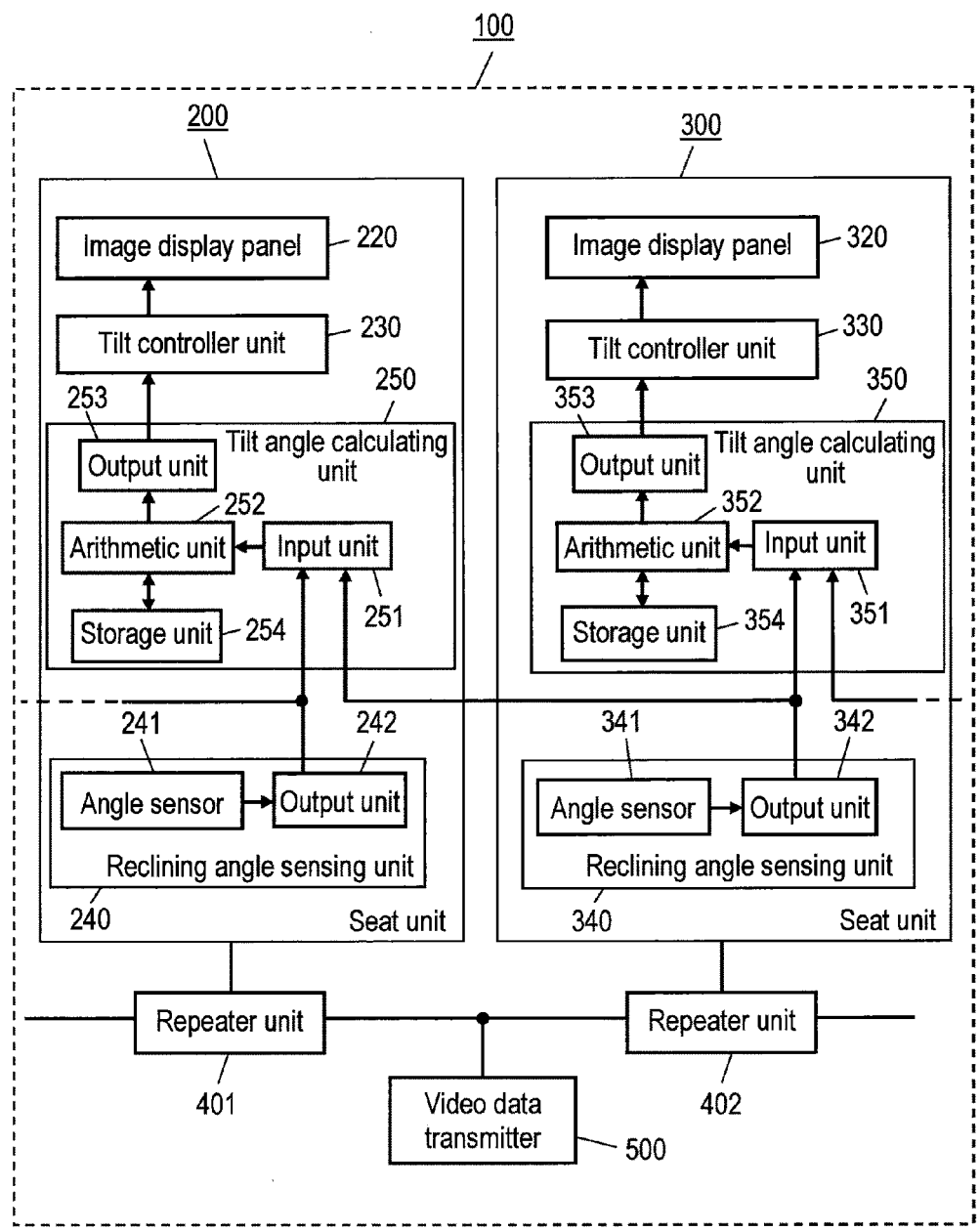
FIG. 2 is a circuit block diagram showing a main structure of the image display device.

FIG. 1 is a schematic view showing a key structure of a seat row provided with image display devices according to the exemplary embodiment of this invention, and it is the basic structure illustrating components of seat row 1 represented by two adjoining seats among a group of seats provided with image display device 100 shown in FIG. 2.

Among a plurality of seat units arranged in a front-to-back direction on floor surface G, one seat unit 2 located in the nth position from the front end (referred to as "seat 2", and this also applies to other seat units) comprises seating part 20, backrest 21, armrests 22 and legs 23. Backrest 21 is constructed reclinable in various angles about reclining shaft 26. Seat 2 is provided with image display panel 25 installed on the back of backrest 21 in a manner that a tilt angle is variable about tilting pivot 24. Image display panel 25 displays a video image according to a signal sent from video data transmitter 500 shown in FIG. 2. Tilting pivot 24 is equipped with tilt controller unit 27 in engagement therewith for controlling the tilt angle of image display panel 25. Reclining shaft 26 has reclining angle sensing unit 28 attached to it for detecting a reclining angle of backrest 21. Tilt controller unit 27 comprises cogwheels and a stepping motor for driving them, and reclining angle sensing unit 28 comprises an angle sensor or the like device for detecting the reclining angle of backrest 21.

There is tilt angle calculating unit 29 disposed under seating part 20, and tilt controller unit 27 uses a calculating result provided by tilt angle calculating unit 29 to control the tilt angle of image display panel 25.

Another seat 3 located in the (n+1)th position adjoining in the front-to-back direction also has a structure similar to that of seat 2. Seat 3 comprises seating part 30, backrest 31, armrests 32, legs 33, tilting pivot 34, image display panel 35, reclining shaft 36, tilt controller unit 37, reclining angle sensing unit 38 and tilt angle calculating unit 39. Other seats also comprise like structural components.

Image display panels 25 and 35 can be comprised of thin display devices such as organic EL panels and electronic papers beside liquid crystal panels. The locations where tilt angle calculating units 29 and 39 are disposed need not be limited to the underside of seating parts 20 and 30, but they can be located in any other places. It is also possible to build in tilt angle calculating units 29 and 39 inside the image display panels 25 and 35. This can save spaces and reduce wiring materials.

Referring now to FIG. 2, description is provided of the structure and the function of image display device 100 according to this exemplary embodiment of the invention.

FIG. 2 is a circuit block diagram showing the main structure of image display device 100 according to this exemplary embodiment of the invention. FIG. 2 represents an example of image display device 100 configured by including two adjoining seat units 200 and 300, which are located in the nth and (n+1)th positions from the front end in a group of seat units arranged at least in the front-to-back direction on floor surface G shown in FIG. 1. Seat units 200 and 300 correspond to seat units 2 and 3 respectively of FIG. 1. Seat unit 200 is an example of a first seat, and seat unit 300 is an example of a second seat.

Image display device 100 comprises seat unit 200, seat unit 300, repeater units 401 and 402, and video data transmitter 500. Both seat units 200 and 300 are connected with video data transmitter 500 through repeater units 401 and 402 respectively. In addition, seat units 200 and 300 are provided with image display panels 220 and 320, tilt controller units 230 and 330, reclining angle sensing units 240 and 340, and tilt angle calculating units 250 and 350 respectively. Image display panels 220 and 320 also correspond to image display panels 25 and 35 respectively of FIG. 1. Tilt controller units 230 and 330 correspond to tilt controller units 27 and 37 respectively of FIG. 1. Reclining angle sensing units 240 and 340 also correspond to reclining angle sensing units 28 and 38 respectively of FIG. 1. Reclining angle sensing unit 240 is an example of the first angle sensing unit, and reclining angle sensing unit 340 is an example of the second angle sensing unit. Tilt angle calculating units 250 and 350 correspond to tilt angle calculating units 29 and 39 respectively of FIG. 1.

Using seat unit 200 as an example, description is provided of the structure and the function of image display device 100. The same description also applies to seat unit 300.

Reclining angle sensing unit 240 comprises angle sensor 241 and output unit 242, wherein angle sensor 241 is adapted to detect a reclining angle of backrest 21 of seat 2 (FIG. 1) and generates an output voltage corresponding to the angle. An angle data detected here is sent to tilt angle calculating unit 250 from output unit 242, which is provided with an amplifier.

Tilt angle calculating unit 250 comprises input unit 251, arithmetic unit 252, output unit 253, and storage unit 254. Input unit 251 receives the data output from reclining angle sensing unit 240 as the first sensing unit disposed in seat unit 200, as well as another data output from reclining angle sensing unit 340 as the second sensing unit, disposed in seat unit 300 (i.e., the seat unit located immediately behind along the front-to-back direction). Input unit 251 converts the received voltage data into a digital data with an A/D converter, and sends it to arithmetic unit 252. Arithmetic unit 252 is provided with a CPU ("Central Processing Unit") and the like. Based on the data related to the reclining angles of backrests 21 and 31 (FIG. 1) received from input unit 251, arithmetic unit 252 calculates an angle for the user in seat 3 to view image display panel 220 easily by using a formula and the relevant information for the calculation of the tilt angle. Arithmetic unit 252 then establishes an optimum tilt angle of image display panel 220. The formula and the relevant information for the calculation of the tilt angle are stored in storage unit 254 provided with a ROM ("Read Only Memory") and the like. The calculated data is sent to output unit 253. Output unit 253 converts the digital data into an analog voltage with a D/A converter, generates a stepping motor control signal corresponding to the tilt angle, and sends it as a tilt control data to tilt controller unit 230.

Tilt controller unit 230 comprises a stepping motor for driving and a stepping motor control circuit, for instance, so that it is capable of controlling the tilt angle of image display panel 220 either directly or through cogwheels. This control of the tilt angle is carried out according to the output data from output unit 253 of tilt angle calculating unit 250.

Figure 3:
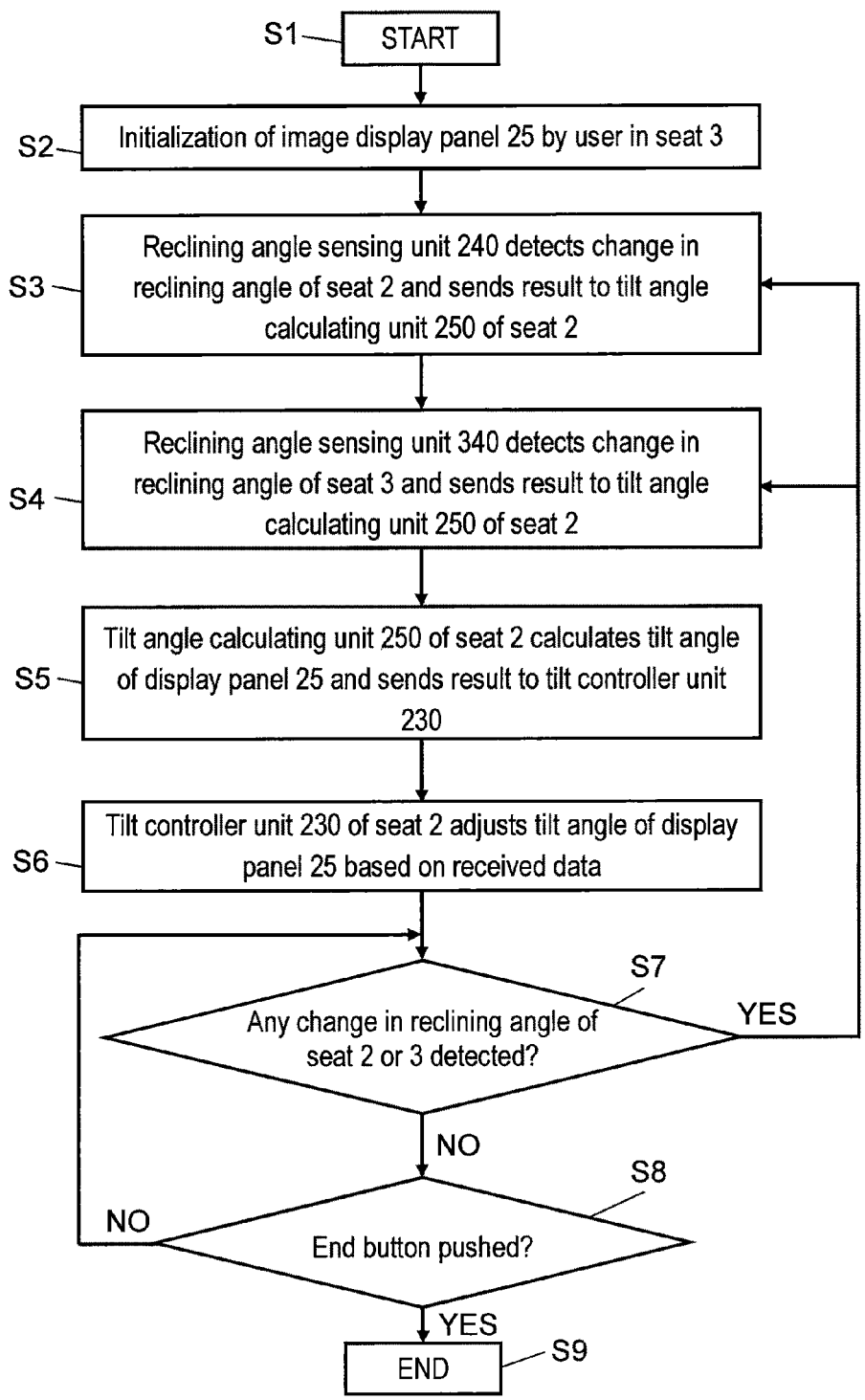
FIG. 3 is a flow chart showing operating steps of the image display device.

Description is provided next of the steps of operating image display device 100 according to this exemplary embodiment by taking a case, in which a person in seat 3 uses image display device 100 of FIG. 1. FIG. 3 is a flow chart showing the operating steps of image display device 100 according to this exemplary embodiment of the invention.

As shown in FIG. 3, image display device 100 starts operating by such means as automatically detecting a user when he takes seat 3, or when the user pushes a power supply button provided on image display panel 25 (step S1).

The user sitting on seat 3 initializes image display device 100 (step S2). One method of the initialization, for instance, is for the user to adjust image display panel 25 installed on seat 2 to any position desirable for viewing the screen. Image display device 100 is so constructed that a tilt mechanism (not shown) of image display panel 25 is manually operable so that the initialization may be made by adjusting it with a hand. The adjustment of the tilt angle of image display panel 25 may also be made by other means such as manipulation of an angle adjuster switch (not shown) disposed on image display panel 25.

Upon completion of the initialization by the user, reclining angle sensing unit 240 detects a change in the reclining angle of seat 2, and sends a result of the detection to tilt angle calculating unit 250 inside seat 2 (step S3).

Reclining angle sensing unit 340 also detects any change in the reclining angle of seat 3, and sends a result of the detection to tilt angle calculating unit 250 in seat 2 (step S4).

In the next step, tilt angle calculating unit 250 in seat 2 calculates a proper tilt angle of image display panel 25 based on the data received from reclining angle sensing units 240 and 340, and sends a result of the calculation to tilt controller unit 230 (step S5).

Tilt controller unit 230 of seat 2 adjusts the tilt angle of image display panel 25 according to the data received from tilt angle calculating unit 250 (step S6).

If there is a change in the reclining angle of any of seats 2 and 3, at least one of reclining angle sensing units 240 and 340 detects the change, and repeats the operation following any of step S3 or step S4 (step S7).

When there is not any change in the reclining angles of seats 2 and 3, the tilt angle of image display panel 25 is kept unchanged. Finally, a confirmation is made to determine if the user executes any manipulation such as pushing an end button provided on image display panel 25 (step S8), and the operation goes back to step S7 if the end button is not pushed, or the operation of image display device ends if the end button is determined pushed in step S8 (step S9).

Figure 4:
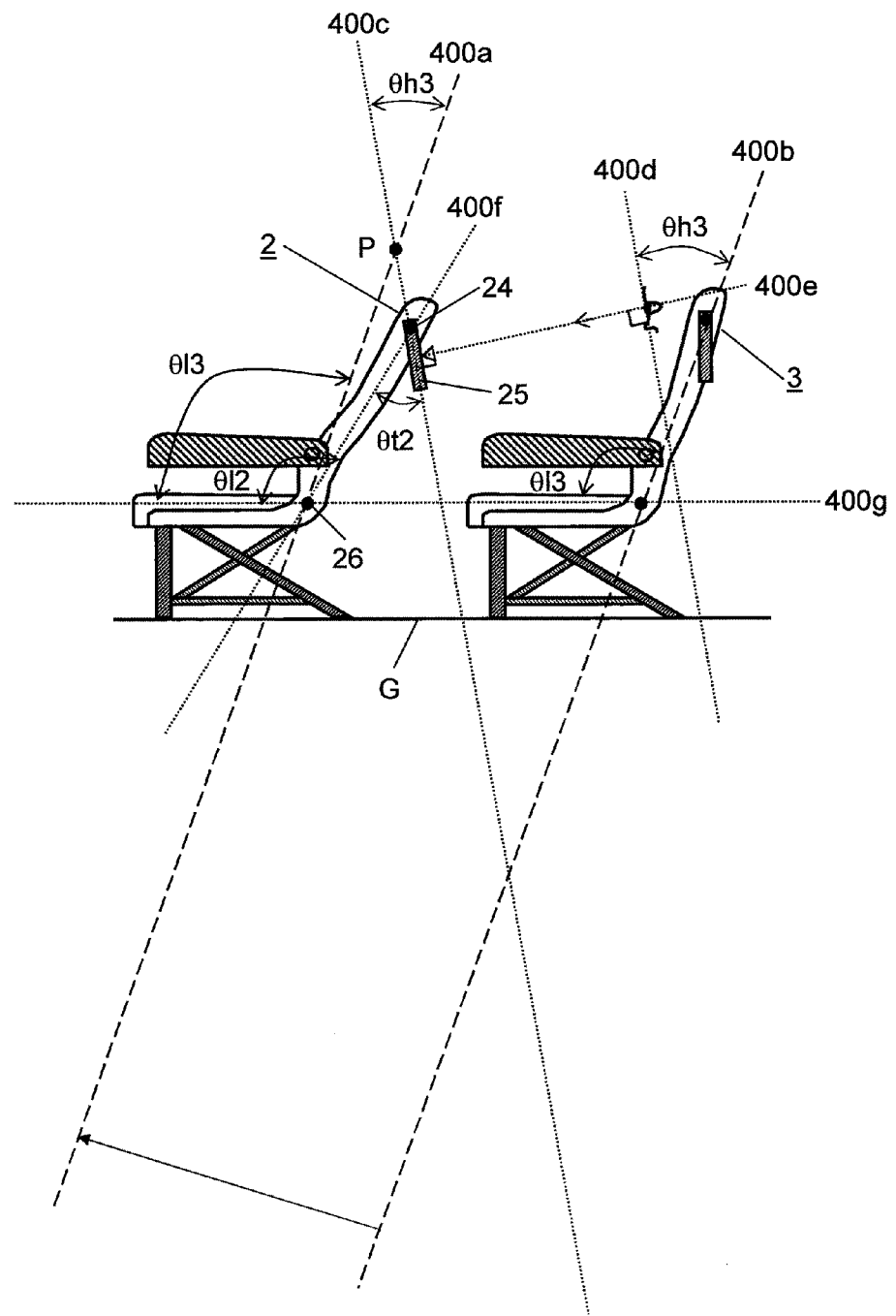
FIG. 4 is a schematic view illustrating operation of the image display device and the function thereof.
Figure 6A:
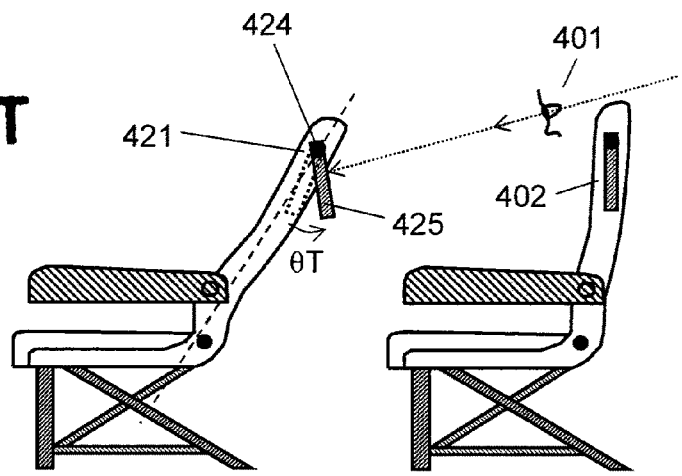
FIG. 6A is a schematic view showing a key structure of a seat row provided with a conventional image display device.
Figure 6B:
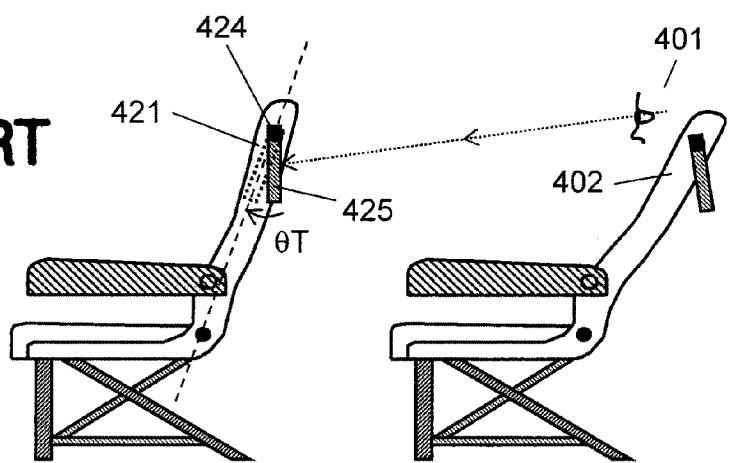
FIG. 6B is another schematic view showing the key structure of the seat row provided with the same conventional image display device.
Figure 7A:
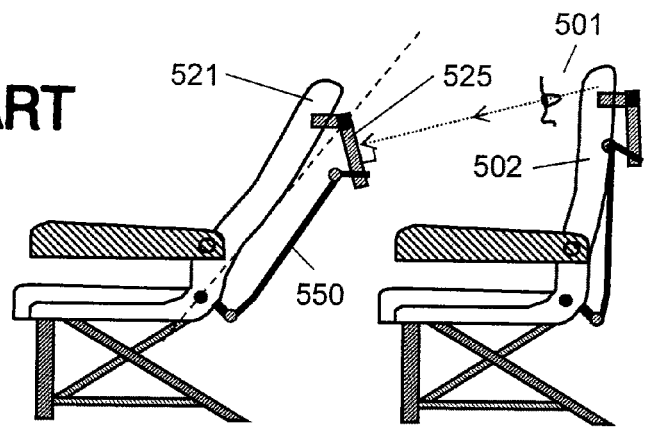
FIG. 7A is a schematic view showing a key structure of a seat row provided with another conventional image display device.
Figure 7B:
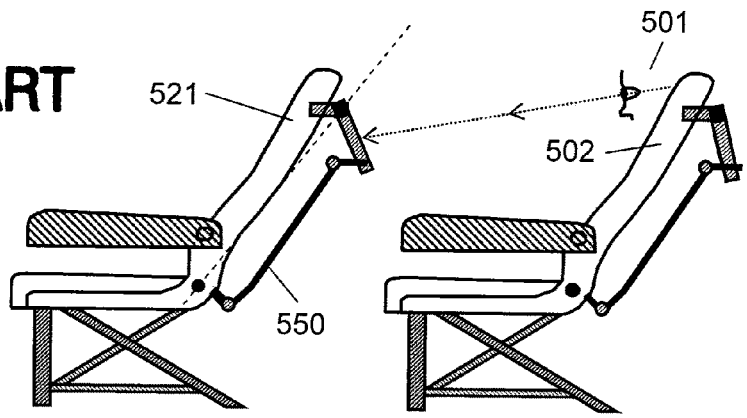
FIG. 7B is another schematic view showing the key structure of the seat row provided with the same conventional image display device.

Referring to FIG. 4, description is provided next of a method of calculating the tilt angle of image display panel 25 in image display device 100 according to the exemplary embodiment of this invention.

FIG. 4 is a schematic view illustrating the operation and the function of the image display device according to the exemplary embodiment of this invention. The schematic view in FIG. 4 shows the same two adjoining seats as those shown in FIG. 1 amongst the group of seats provided with image display device 100 of FIG. 2, wherein additional lines 400a to 400g are drawn to help calculate the tilt angle.

Tilt angle θt2 of image display panel 25 is calculated here by assuming an instance that a user is seated in seat 3 and views image display panel 25 installed on seat 2 in front of him.

Tilt angle θt2 of image display panel 25 is an angle formed at an intersection point of straight line 400f drawn in a direction of the backrest of seat 2 and another straight line 400c drawn along a face of display screen. Reclining angle θl3 of seat 3 is an angle formed at an intersection point of straight line 400g in parallel with floor surface G and another straight line 400b drawn in a direction of the backrest of seat 3. Reclining angle θl2 of seat 2 is an angle formed at an intersection point of straight line 400g and the straight line 400f drawn in the direction of the backrest of seat 2.

When straight line 400d is drawn at right angles to a viewing direction of the user sitting on seat 3 toward image display panel 25, it intersects straight line 400b drawn in the direction of the backrest of seat 3, and an angle formed here is labeled as θh3. Although angle θh3 changes depending on a height and a sitting posture of the user, this exemplary embodiment of the invention is devised to set image display panel 25 in such an orientation that the display screen is perpendicular (i.e., confronting straight) to the viewing direction of the user at all times since it is generally the easiest to see the screen when image display panel 25 is perpendicular to the user. In other words, tilt angle calculating units 250 and 350 calculate a degree of the tilt angle that brings image display panels 220 and 320 in the orientation to confront straight against the standard viewing positions in the seats. Straight line 400c and straight line 400e thus become orthogonal to each other at all the time.

Straight line 400a is drawn in parallel to straight line 400b through reclining shaft 26 located at the point of intersection of straight line 400g and straight lines 400f. In the triangle formed by intersection point P of straight lines 400a and 400c, tilting pivot 24 and reclining shafts 26, the relations among their interior angles and exterior angles give the following equation to obtain tilt angle θt2 of image display panel 25:

$$\theta t2 = \theta l2 - \theta l3 + \theta h3$$

This mathematical formula for tilt angle θt2 of image display panel 25 on seat 2 is stored in storage unit 254 inside tilt angle calculating unit 250 shown in FIG. 2. The same is also true for other seats.

In this exemplary embodiment of the invention, a plurality of values are additionally preset beforehand for use as the easily viewable angle θh3, which is dependent upon the height and posture of the viewer and determined as a standard viewing position when initializing the tilt angle of image display panel 25. The viewer can select any of the preset values, or he can even select a degree of variation in the tilt angle of his choice from a number of preset values. The setting of angle θh3 may be made by such a method as hierarchically dividing various heights of eyes of viewers and reclining angles, and combining them, for instance, and the data related to the initialization of viewers are stored in a register (not shown) of storage unit 254 of tilt angle calculating unit 250.

Table 1 shows an example of setting angle θh3. In this example, reclining angles of the viewers are grouped into two levels of large and small, and heights of eyes of the viewers are also grouped into two hierarchical levels of adult and child for a total of four combinations, which are labeled as Ah1, Ah2, Ah3 and Ah4, and their corresponding values of angle are preset in advance.

TABLE 1

| Reclining angle | Height of eyes of viewer | |
|---|---|---|
|  | Adult | Child |
| Small (θ13 < θth) | Ah1 | Ah2 |
| Large (θ13 ≧ θth) | Ah3 | Ah4 |

The user sitting on seat 3 selects individual items with an initialization switch (not shown) provided on image display panel 25 installed on seat 2 in front of him, and sets an angle data output from the angle sensor.

In the example shown in Table 1, in which the reclining angles are grouped into two levels of large and small with the dividing point set at θth, image display panel 25 is provided with the following variations of tilt angle θt2:

Adult is selected with $θl3<θth \ldots θt2=θl2-θl3+Ah1$;

Child is selected with $θl3<θth \ldots θt2=θl2-θl3+Ah2$;

Adult is selected with $θl3>θth \ldots θt2=θl2-θl3+Ah3$; and

Child is selected with $θl3>θth \ldots θt2=θl2-θl3+Ah4$.

According to this exemplary embodiment of the invention, as described above, the image display device serves the users with representation of video images via the image display panels installed on the plurality of seats arranged at least in the front-to-back direction, while maintaining the optimum tilt angles of the image display panels at all times for the variety of users sitting on individual seats and various viewing conditions corresponding to them. In particular, the image display device is capable of adjusting any of image display panels 25 to its optimum tilt angle for the viewer sitting on a seat according to a reclining angle of the backrest of the seat and another reclining angle of the backrest of the seat in front of him. The viewer can hence enjoy watching the video images presented in the screen comfortably at all the time regardless of the reclining positions of both his seat and the seat in front of him.

In image display device 100 according to this exemplary embodiment of the invention shown in FIG. 2, seat unit 200 includes all of reclining angle sensing unit 240, tilt angle calculating unit 250 and tilt controller units 230. It is possible, however, to compose reclining angle sensing unit 240, tilt angle calculating unit 250 and tilt controller unit 230 so that at least one or all of their functions becomes useful for a plurality of image display panels. For instance, all of the functions of tilt angle calculating unit 250 and parts of the functions of reclining angle sensing unit 240 and tilt controller unit 230 can be combined into video data transmitter 500. The structure composed in this manner can also demonstrate the similar advantageous effects as those of the above exemplary embodiment of this invention. The structure discussed above can make use of a part or all of the functions of the components constituting image display device 100 for use commonly in the plurality of image display panels. Accordingly, the structural components of image display device 100 related to the adjusting function of the tilt angles of the image display panels can be integrated and controlled comprehensively. It thus becomes possible to provide the image display device having a less number of component parts, yet capable of presenting uniform and high-quality video images.

Referring to FIG. 5, description is provided next of another structure of image display device 100 according to this exemplary embodiment of the invention. FIG. 5 is a circuit block diagram showing a main structure of image display device 100 according to this exemplary embodiment of the invention. The structure of image display device 100 of FIG. 5 comprises viewing position determination units 261 and 361 in addition to that of image display device 100 shown in FIG. 2. The structure is thus identical to that of FIG. 2 except for viewing position determination units 261 and 361. Description here is therefore given mainly of viewing position determination units 261 and 361.

Viewing position determination units 261 and 361 comprise an image sensor, for instance, that senses and determines a viewing position of a person sitting on seat 3 and watching image display panel 25. Viewing position determination unit 361 sends to input unit 251 a data on the viewing position it sensed and determined. Input unit 251 converts the received data into a digital data with the A/D converter, for instance, and sends it to arithmetic unit 252. Tilt angle calculating unit 250 can thus calculate a tilt angle of image display panel 25 confronting straight against the viewer based on the output data of viewing position determination unit 361. The structure illustrated here can hence detect the viewing position of the viewer sitting and viewing the image display panel, and adjust the tilt angle of the image display panel to bring it confront straight against the viewing position of the viewer. Accordingly, the invention achieves the image display device capable of allowing a variety of viewers to watch image display panels 25 with their tilt angles adjusted to the optimum positions for the individual viewers.

As illustrated above, the image display device of the present invention has the functions of detecting angles of the backrests of two seats adjoining each other in the front-to-back direction, calculating the proper tilt angle of the image display panel according to the detected data, and control the tilt angle of the image display panel according to the calculated data. The viewer of the image display device can hence watch video images in the image display panel at the optimum angle regardless of the reclining positions of both his seat and the seat in front of him. Accordingly, the invention can provide the image display device for passenger seats of excellent human interface and high quality.

Moreover, the image display device of the present invention comprises the component parts so designed that any or all of their functions are commonly useable for the plurality of image display panels. This structure hence allows integration of all the structural components related to the adjusting function of the tilt angles of the image display panels in the image display device, and controlling them comprehensively. The structure can thus provide the image display device with a less number of component parts, yet capable of presenting uniform and high-quality video images.

The image display device of the present invention also comprises the angle sensing units, the tilt angle calculating units and the tilt controller units designed to be placed under the individual passenger seats. This structure allows a unitary configuration of the various components having the function of controlling the tilt angle of the image display panel so that each unit can be distributed to each seat separately. As a result, this structure of unitary system can fully demonstrate its advantage of the ease of handling during installation of the image display device and in case of any trouble thereafter.

In the image display device of the present invention, the tilt angle calculating unit calculates the tilt angle that brings the image display panel in the orientation confronting straight against the standard viewing position in the seat. This structure makes it possible to set the standard viewing position of the user for use in adjusting the tilt angle of the image display panel to the orientation confronting straight against the standard viewing position. This can hence achieve the image display device capable of providing the optimum tilt angle with consideration given to the viewing position of the user.

Furthermore, the image display device of the present invention has plural levels of standard viewing positions set for various users, so that the tilt angle of the image display panel can be adjusted in a manner to confront against any of these standard viewing positions. Accordingly, this can achieve the image display device capable of providing the optimum tilt angle with consideration given to the viewing positions for various users of different hierarchical levels.

In addition, the image display device of the present invention has the functions of sensing a viewing position of a person watching the image display panel and adjusting the tilt angle of the image display panel to bring it confront straight against the viewing position of the viewer. The invention thus achieves the image display device capable of allowing a variety of viewers to watch the image display panels with the tilt angle adjusted to the optimum positions for the individual viewers.

According to the present invention, as has been obvious from the above description, the image display device is capable of automatically adjusting the tilt angle of the image display panel to bring it to the angle easier for the viewer to watch even if the reclining angle is changed in any of the adjoining seats arranged in the front-to-back direction. The viewer can thus use the image display device and watch video images in the image display panel at the optimum angle regardless of the reclining positions of both his seat and the seat in front of him.

INDUSTRIAL APPLICABILITY

The image display device of the present invention can provide excellent human interface with the users, and is therefore useful for installation in an aircraft, a train and the like having a plurality of passenger seats arranged at least in the front-to-back direction, as illustrated above.

The invention claimed is:

1. An image display device comprising:
   seats arranged at least in a front-to-back direction, each of the seats having a backrest of a variable angle;
   image display panels, each of the image display panels being installed on a back of each of the seats;
   reclining angle sensing units, each of the reclining angle sensing units for detecting an angle of each corresponding one of the backrests;
   tilt angle calculating units, each of the tilt angle calculating units for calculating a tilt angle of each of the image display panels based on an output data of each of the angle sensing units related to two adjoining seats in the front-to-back direction; and
   tilt controller units, each of the tilt controller units for controlling the tilt angle of each of the image display panels according to an output data of each of the tilt angle calculating units.

2. The image display device of claim 1, wherein at least a part of functions of at least one of the reclining angle sensing units, the tilt angle calculating units and the tilt controller units is commonly used in the image display panels.

3. The image display device in claim 2, wherein each of the tilt angle calculating units calculates a tilt angle for each of the image display panels to be perpendicular to a standard viewing position of a rearwardly adjoining seat in the front-back direction.

4. The image display device of claim 3, wherein each of the image display devices is adapted for presetting a plurality of standard viewing positions for certain sized seat occupants.

5. The image display device in claim 2, further comprising:
   viewing position determination units, each of the viewing position determination units for detecting a viewing position of a person sitting on a rearwardly adjoining seat in the front-back direction and watching each of the image display panels,
   wherein each of the tilt angle calculating units calculates a tilt angle for each of the image display panels to be perpendicular to the viewing position of the person on the rearwardly adjoining seat in the front-back direction.

6. The image display device in claim 1, wherein each of the tilt angle calculating units calculates a tilt angle for each of the image display panels to be perpendicular to a standard viewing position of rearwardly adjoining seat in the front-back direction.

7. The image display device of claim 6, wherein each of the image display devices is adapted for presetting a plurality of standard viewing positions for certain sized seat occupants.

8. The image display device in claim 1, further comprising:
   viewing position determination units, each of the viewing position determination units for detecting a viewing position of a person sitting on a rearwardly adjoining seat in the front-back direction and watching each of the image display panels,
   wherein each of the tilt angle calculating units calculates a tilt angle for each of the image display panels to be perpendicular to the viewing position of the person on the rearwardly adjoining seat in the front-back direction.

9. An image display device comprising:
   an image display panel installed on a back of a first seat having a backrest of a variable angle;
   a first angle sensing unit for detecting an angle of the backrest of the first seat having the image display panel installed thereon;
   a second angle sensing unit for detecting an angle of a backrest of a second seat adjoining behind the first seat;
   a tilt angle calculating unit for calculating a tilt angle of the image display panel installed on the first seat based on the angles of the backrests of the seats detected by the first angle sensing unit and the second angle sensing unit; and
   a tilt controller unit for controlling the tilt angle of the image display panel according to the tilt angle calculated by the tilt angle calculating unit.

10. The image display device in claim 9, wherein the tilt angle calculating unit calculates a tilt angle for the image display panel to be perpendicular to a standard viewing position of the second seat.

11. The image display device of claim 10, wherein the image display device is adapted for presetting a plurality of standard viewing positions for certain sized seat occupants.

12. The image display device in claim 9 further comprising: a viewing position determination unit for detecting a viewing position of a person sitting on the second seat and watching the image display panel, wherein the tilt angle calculating unit calculates a tilt angle for the image display panel to be perpendicular to the viewing position of the person on the second seat.

* * * * *